UNITED STATES PATENT OFFICE.

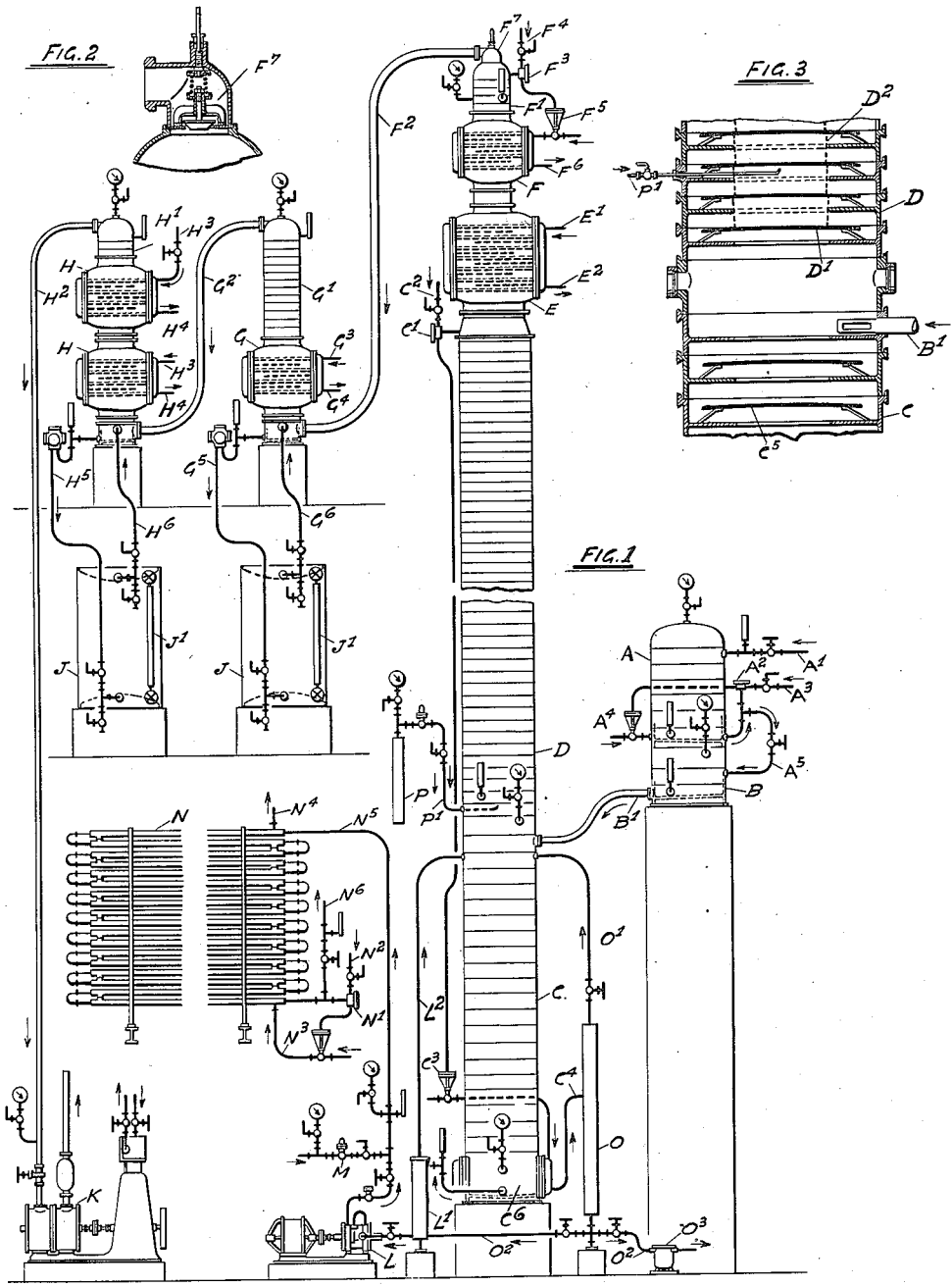

JOSEPH SCHNEIBLE, OF CHICAGO, ILLINOIS.

MANUFACTURE OF ETHYL ALCOHOL AND RESIDUE FROM BEVERAGE.

1,311,421.     Specification of Letters Patent.     Patented July 29, 1919.

Application filed November 21, 1918. Serial No. 263,613.

*To all whom it may concern:*

Be it known that I, JOSEPH SCHNEIBLE, a citizen of the United States, residing at Chicago, in the county of Cook and State of Illinois, have invented a new and useful Improvement in the Manufacture of Ethyl Alcohol and Residue from Beverage, of which the following is a specification.

My invention relates to improvements in the manufacture of ethyl alcohol and residue - liquid of distillation for beverage manufacture; and it is my object to provide a process for removing, in a single continuous operation and in one set of apparatus, pure and high-grade alcohol and residue liquid from the distilling material, which residue-liquid shall not only contain the remaining extract-matter of the fermented mash, wort or must in unimpaired condition, but also the volatile products of fermentation which impart taste, flavor and aroma and lend character to the beverage for the manufacture of which the residue is thus rendered superior.

The material on which my process is practised is a fermented mash, wort or must, the fermentation of which has been performed in any known or suitable manner to insure normally complete attenuation of the fermentable sugars, and the preparation, as also the clarification or secondary fermentation and aging of which, for the development of taste and flavor, should be conducted in a manner suitable to the particular materials used and according to the type of beverage desired. The fermented material contains, besides ethyl alcohol, vaporizable bodies, some of which have boiling-points higher while some have boiling-points lower than the boiling-point of ethyl alcohol. The higher boiling-point products are the carriers of aroma, taste and flavor, and it is an important object of my invention to retain these in the residue for the beverage to be manufactured therewith, while the lower boiling-point products are not desirable either in the alcohol or the beverage because of their ready susceptibility to oxidation.

The apparatus which I have especially devised for the practice of my process, and which is illustrated in the accompanying drawing, involves a heater into which the fermented material to be distilled is introduced, this heater surmounting and communicating with a fractionating column, or fractionator, which discharges the vapors and liquid from its lower portion through a conduit into the upper portion of a column-still surmounted by and communicating with a dephlegmator-column carrying a dephlegmator, above which etxends an auxiliary dephlegmator. An alcohol - vapor conduit connects the bonnet of the auxiliary dephlegmator with the lower end of a rectifier, which has its bonnet connected by a vapor - conduit with the lower end of an alcohol-condenser, in turn connected from its bonnet with a vacuum - pump, which serves to maintain proper vapor-tension in the apparatus.

In the drawing, Figure 1 is a generally diagrammatic and partly broken view of the entire apparatus in elevation; Fig. 2 is an enlarged broken view in vertical section of the bonnet-portion of the auxiliary dephlegmator, showing its contained tension-regulator; and Fig. 3 is an enlarged view in vertical sectional elevation of the connected end-portions of the column-still and the dephlegmator-column.

A is the heater, into which the material to be distilled is introduced through a valved inlet-pipe indicated at $A^1$, and which is equipped, as indicated at $A^2$, with a suitable thermostat, to which leads a valved air-pressure line $A^3$, and which is connected with a control-valve $A^4$ in a steam-inlet pipe leading into the heater-bottom, and with a valved pipe-connection, indicated at $A^5$, leading to the fractionator B. The fractionator-surmounted heater is shown to be supported on a pedestal. A vapor and liquid pipe $B^1$ connects the fractionator with the upper end of the column-still C, which is equipped with a suitable thermostat $C^1$ at the upper part of a dephlegmator-column D and provided with an air-pressure line, indicated at $C^2$, a valve $C^3$ in its steam-inlet pipe to the still and an outlet-pipe indicated at $C^4$, for condensed steam. The still C contains a series of spaced annular plates, as shown in Fig. 3, the openings in which are overlapped by raised deflector-plates $C^5$. The dephlegmator-column D rises from the still and contains a series of annular plates overlapped by raised deflector-plates $D^1$, as in the still. An annular screening $D^2$, preferably of copper, extends through the central openings in the series of annular plates between the deflectors $D^1$. A dephlegmator E, surmounting the column D, is supplied with condensing water through a pipe indicated at $E^1$, and with a lower water-outlet, indicated at $E^2$; and this dephlegmator is in turn surmounted by an auxiliary dephlegmator F topped by a vapor-separator, or drier $F^1$ having a bonnet $F^7$ containing a vapor-tension regulator. An alcohol-vapor pipe $F^2$ leads from the bonnet $F^7$ to the lower end of a rectifier G, $G^1$. The tension-regulator in the bonnet $F^7$ maintains uniform back-pressure within the column D. The auxiliary dephlegmator F is also equipped with a thermostat, indicated at $F^3$, to which an air-pressure line $F^4$ leads; and a pipe containing a control valve $F^5$, operated by this thermostat, for introducing refrigerant into the auxiliary dephlegmator, and an outlet-pipe $F^6$ for the refrigerant, are provided, as indicated, to maintain uniform temperature of the vapor at the point of discharge from the dephlegmator. An alcohol-vapor pipe $F^2$ connects the bonnet of the dephlegmating column with the rectifier, the lower part G of which forms the vapor-cooler and the upper part $G^1$ a rectifier, separator or dehydrator. The part $G^1$ has a vapor-outlet pipe $G^2$ leading from its bonnet-like top and is equipped with a refrigerant inlet-pipe, indicated at $G^3$, and with an outlet-pipe, indicated at $G^4$, for the refrigerant. An alcohol try-box is provided in a pipe indicated at $G^5$ leading from the lower end of the rectifier G, which is also provided with a vent-pipe, indicated at $G^6$. The vapor-outlet pipe $G^2$ leads into the lower end of an alcohol-condenser H, H, shown to be supported, like the rectifier, on a pedestal. The uppermost of the two members H forms the bonnet-like vapor-separator $H^1$; and inlet-pipes for refrigerant to each member H and outlet-pipes for the same are indicated, respectively, at $H^3$ and $H^4$, the lower member being equipped, like the rectifier G, $G^1$, with a try-box in the alcohol outlet-pipe, indicated at $H^5$, and a vent-pipe, indicated at $H^6$. A pipe $H^2$ connects the vapor-separator with a vacuum-pump K. J, J denote similar alcohol-collecting tanks, into which the valved pipes $G^5$ and $H^5$ lead, respectively, each being equipped with a gage-glass $J^1$.

At L is represented a motor-driven residue ejector having a valved pipe-connection with a residue-collector $L^1$, between which and the upper end of the column-still C a balancing pipe extends, as indicated at $L^2$. A carbonator, represented at M, has a valved pipe connection with a pipe $N^5$ leading from the discharge-side of the ejector L to a residue-cooler N. This cooler is equipped with a thermostat, indicated at $N^1$, in an air-pressure line, indicated at $N^2$, and is supplied with refrigerant through a pipe containing a thermostat-controlled valve $N^3$. The cooled residue discharges from the cooler N through a valved outlet-pipe, indicated at $N^6$.

Water of condensation from the steam-heated coil in the base $C^6$ of the distilling column C discharges therefrom through the pipe $C^4$ into a water-collector O, which has valved discharge-pipe connections $O^2$, $O^2$ with the residue-collector $L^1$ and residue-ejector L, or with a trap $O^3$ discharging to the atmosphere. The collector O is connected with a valved balancing pipe $O^1$ to the upper part of the still C.

P is an oxygen-gas container discharging into the bottom of the dephlegmator-column D through a valved pipe, indicated at $P^1$.

Assuming that all the different parts of the apparatus are at their respective working temperatures, that suitable low absolute pressures are established and maintained by the pump K in the different parts, and that the beer-like material, usually in a cold condition, is being drawn from a supply thereof at low absolute pressure of about 3 pounds to the square inch into the bonnet of the heater A, the material flows downwardly over the series of plates in the heater and attains a temperature of about 140° F. at the point of discharge, this temperature being thermostatically maintained, as indicated.

The heated material, now a blubbery foamy mass, is drawn by the lower tension of about 2 pounds absolute pressure per square inch, through the valve-controlled pipe $A^5$ into the fractionator B and bursts violently into a mist by reason of such lower pressure being materially below the boiling pressure of the heated material, thereby sundering the gases and part of the volatile components of the fermented material, which, together with the remaining liquid, flow and are drawn through the pipe $B^1$ into the column-still C by the tension maintained therein, which is slightly below that in the fractionator.

As the material descends from plate to plate of the plate-series in the still to the steam-heated base of the column, it becomes de-alcoholized, while the freed gases and vapors, in meeting the rising alcohol-vapors, ascend with the latter into the dephlegmating column D for separation and dephlegmation. In rising within the dephlegmating column, the gases and mixed vapors meet the descending phlegm, which acts upon them until substantially all the taste, flavor and aroma bodies are washed from the vapors, thereby leaving the alcoholic vapors in a substantially pure state to compose a condensate of upward of 90 volume per cent. ethyl alcohol, the other per cent. being water with traces of the most volatile high-boiling-point products amounting to less than three thousandths of one per cent., while all of the taste, flavor and aroma carrying bodies have descended with the phlegm into the base of the still, whence they are withdrawn with the residue by the residue-ejector L through the pipe $N^5$ into the cooler N, to discharge therefrom and be further treated and finished for manufacture into the beverage.

The vapors passing upwardly in the column D may be treated with oxygen in regulated quantity introduced through the pipe $P^1$ from the oxygen-container P to oxidize the lower-boiling products of fermentation which are undesirable either in the aforesaid beverage or the alcohol.

The alcohol-vapors rising through the dephlegmator-column in the dephlegmator E and auxiliary dephlegmator F and passing over the series of pipes and baffles provided therein indicated in Fig. 1, enter the vapor-separator $F^1$ and are drawn, by the lower tension under the action of the pump K, through the pipe $F^2$ into the vapor-drier member G. The vapors rise in this drier, which is also provided with cooling pipes and baffles, through the vapor-separator member $G^1$, whence they are withdrawn by the aforesaid pump-action through the vapor-pipe $G^2$ into the lower member of the condenser H provided with condenser-pipes and baffles, indicated to be provided therein, and past those, similarly indicated, in the upper condenser-member H into the final separator $H^1$. The uncondensed vapors and gases are withdrawn through the pipe $H^2$ by the pump K and the alcohol in the drier G and condenser H is withdrawn through the pipes $G^5$ and $H^5$ and the try-boxes therein, respectively, into the alcohol-collectors J, J; the alcohol collected from the drier G, $G^1$ being above 90 volume per cent., while that collected from the condenser H, H is materially higher, usually above 97 volume per cent.

From the foregoing description of my process, it will be understood to be based on the fact that when alcoholic vapors rise from a primary still directly into a dephlegmating column and are sufficiently concentrated therein, that is to say, to not less than about 90 volume per cent., the taste, flavor and aroma carrying products dephlegmate with the water given off by the alcoholic vapors and, not being intercepted, they are carried downwardly with the watery phlegm into the residue at the base of the still.

The low-boiling-point products being, as aforesaid, undesirable either in the ethyl alcohol or the beverage-stock, may either be exhausted with other uncondensable matter to the atmosphere, or they may, while in vapor-form, act as a reducing agent on, say, oxygen in the presence of a catalyzer, such as copper screening, and be made available by dephlegmation for the residue liquor as an acidifier for adding to the piquancy of the taste of the residue. For the last-named purpose, the oxygen-container P is connected with the dephlegmator-column and the screening $D^1$ in the latter affords the catalyzing element.

The apparatus illustrated, built on a proper scale is capable of producing about 12,500 gallons of beverage per day and 650 gallons, calculated as absolute alcohol, from beer-like distilling-material having an alcohol-content of 5¼ per cent., which is the material herein intended as an example for treatment by my improved process. This apparatus will carry out the process perfectly, but the size and details may be varied for other capacities and to meet the requirements of any particular distilling material and of the grade or quality of the final products. Under all circumstances, however, to obtain the best results by practising my process, the following-named directions, based on practical experience in operating it, should be carefully observed:

To break up the physical combination of the components of the distilling material before it enters the still; to maintain proper boiling-temperature of the material in the base of the still; to maintain uniformity of pressures within the dephlegmating column; to control the temperature of the ethyl-alcohol vapor leaving the bonnet of the dephlegmating-column by controlling the refrigerant in the auxiliary dephlegmator; to maintain a sufficiently lower pressure in the alcohol-condensers to permit regulation of back-pressure within the dephlegmating column; and to guard against alcohol-vapor of less than about 90 per cent. strength leaving the bonnet of the dephlegmator-column, since some of the most valuable aromatic bodies do not appear to separate from them until a strength of 80 to 85 per cent. has been attained.

It may furthermore be suggested that while the volume (minus alcohol) of the fermented material used remains substantially the same in the residue, it is often desirable and to the advantage of the beverage made from the residue to dilute the latter; and for convenience in effecting such dilution I have provided, for adding the water of condensation from the steam used for heating, the condensed water-collector O, from which water may be withdrawn by the action of the ejector L and mixed with the residue on its way to the cooler N. The water of condensation so added is subjected to the influence of the low pressure maintained in the distilling column by means of a pressure-equalizing pipe $O^1$, which connects the water-collector O with the distilling column C, thus depriving the condensate, before mixing with the residue, of any possible gases.

It will be understood that the residue of distillation with its admixture is, on leaving the ejector L, entirely free from carbonic acid gas and consequently liable to absorb atmospheric air and be contaminated thereby. To avoid this, I immediately charge the liquid with $CO_2$ gas, not necessarily to effervescence, but at least to the degree that still wines usually attain in their natural state.

I claim:

1. Manufacturing ethyl-alcohol and residue for beverage from fermented liquor, by distilling the liquor, freeing the high boiling products from the alcoholic vapors, exhausting the vapors of ethyl alcohol and low boiling-point products and withdrawing the residue of distillation containing the high-boiling point products for beverage.

2. Manufacturing ethyl-alcohol and residue for beverage from fermented liquor by distilling the liquor, freeing the high boiling products from the alcoholic vapors, exhausting the vapors of ethyl alcohol and low-boiling-point products from the still, condensing the ethyl-alcohol, and withdrawing the residue of distillation containing the high-boiling-point products for beverage.

3. Manufacturing ethyl alcohol and residue for beverage from fermented liquor by distilling the liquor, acidifying the oxidizable low-boiling-point vapors, freeing the high-boiling-point products from the alcohol vapors, withdrawing the ethyl-alcohol remaining unoxidized and the low-boiling-point products from the still, condensing the ethyl-alcohol and withdrawing the residue of distillation containing the high-boiling-point products for beverage.

4. Manufacturing ethyl-alcohol and residue-liquid for beverage from fermented liquor, by subjecting the liquor to distilling conditions, freeing the high-boiling point products from the alcoholic vapors, exhausting the vapors of ethyl-alcohol and low-boiling-point products, mingling the phlegm and its contained high boiling-point products with the distilling liquor and withdrawing the residue of distillation with the high-boiling point products therein contained for beverage.

JOSEPH SCHNEIBLE.